United States Patent [19]

Heino et al.

[11] Patent Number: 5,267,655
[45] Date of Patent: Dec. 7, 1993

[54] METHOD AND APPARATUS FOR TREATING A GAS CONTAINING AQUEOUS FIBER SUSPENSION

[75] Inventors: Jukka Heino, Savonlinna; Kaj Henricson, Kotka; Pasi Immonen; Raimo Kohonen, both of Savonlinna; Erikki Savolainen, Haapakallio; Pentti Vikiö, Kerimaki, all of Finland

[73] Assignee: A. Ahlstrom Corporation, Noormarkku, Finland

[21] Appl. No.: 737,245

[22] Filed: Jul. 29, 1991

[30] Foreign Application Priority Data

Aug. 14, 1990 [FI] Finland .................................. 904001

[51] Int. Cl.⁵ .............................................. B01D 37/00
[52] U.S. Cl. ...................................... 210/767; 210/772; 210/195.1; 210/258; 210/260; 162/20; 162/23; 162/25; 162/60
[58] Field of Search ............... 210/767, 772, 258, 260, 210/195.1; 162/25, 43, 60, 5, 20, 23; 55/55, 57

[56] References Cited

U.S. PATENT DOCUMENTS

| Re. 28,777 | 4/1976 | Wilder | 162/5 |
|---|---|---|---|
| 2,571,219 | 10/1951 | De Cew | 55/55 |
| 2,685,937 | 8/1954 | Clark et al. | 55/55 |
| 3,131,117 | 4/1964 | Hickey | 55/55 |
| 3,145,134 | 8/1964 | Roberson et al. | 162/43 |
| 4,014,736 | 3/1977 | Sexton | 210/772 |
| 4,485,646 | 12/1984 | Henricson | 162/20 |
| 4,643,800 | 2/1987 | Maloney et al. | 162/5 |

FOREIGN PATENT DOCUMENTS

0330387 8/1989 European Pat. Off. .
363363 1/1974 Sweden .

*Primary Examiner*—Robert A. Dawson
*Assistant Examiner*—Ana M. Fortuna
*Attorney, Agent, or Firm*—Cohen, Pontani, Lieberman, Pavane

[57] ABSTRACT

Method and apparatus for treating a gas containing aqueous fiber suspension in a fiber line process of a pulp mill including at least one of pulp screening, washing and bleaching includes (a) transferring the gas containing fiber suspension at a consistency to a treatment station; (b) treating said fiber suspension at the same level by removing a portion of the water from the fiber suspension so as to generate aqueous filtrate and treated fiber suspension having a relatively higher consistency; (c) simultaneously pumping and degassing the filtrate at the same level; and (d) pumping the treated fiber suspension having the relatively higher consistency away from the treatment station at the same level by imparting to the treated fiber suspension sufficient shear force so as to render the fiber suspension pumpable.

14 Claims, 3 Drawing Sheets

METHOD AND APPARATUS FOR TREATING A GAS CONTAINING AQUEOUS FIBER SUSPENSION

FIELD OF THE INVENTION

The present invention relates to a method and apparatus for treating a gas containing aqueous fiber suspension in a number of fiber line processes of a pulp mill at a single floor level thereby greatly reducing construction costs of a pulp plant as well as the operating costs thereof.

BACKGROUND OF THE INVENTION

A modern pulp plant is composed of several departments or processing stations which include, for example, digestion, screening, washing and bleaching departments. The process flow or so-called "fiber line" of a pulp plant is composed of these processing stations, each including its own characteristic process steps or stages for treating the pump or fiber suspension. These individual departments comprising the fiber line are usually located in a three-story building with an individual story height of about 6 m or more.

Gas is present in pulp suspensions mainly in three forms, namely, in the form of small bubbles, dissolved or chemical bound gas.

The chemically bound gas or dissolved gas seldom causes problems in the pulp and papermaking processes but can cause problems if conditions are changed and bubbles start to form.

Gas bubbles in the fiber suspension can be present as free bubbles in the liquid between the fibers or as bound bubbles attached to fibers. Both bound and free bubbles cause problems in the papermaking processes. Free bubbles cause special problems in the pulp and papermaking processes when they are present in too great an amount. The problems include foam problems, instability of the processes, decreased deaerating, and the like. The method of the present invention relates to the separation and removal of most of the free air bubbles so that the problems caused by an excess amount of free air bubbles are eliminated.

Total gas removal is generally accomplished by another type of gas removal, so-called mechanical gas separation. With this method, all of the free and bound gas bubbles are removed. Also part of the dissolved gas is removed. This type of gas removal is performed immediately in front of the paper machine forming section to avoid pinholes and other problems on the forming wire. This method, which is described by K. D. Kurz, Tappi Engineering Conference, Sept. 19-21, (1978), is expensive and creates large amounts of foam when the fiber suspension is ejected with high speed onto a metal surface in a vacuum tank.

The traditional degassing assemblies in the pulp and paper industry are remarkably space demanding and hence costly, and the separated gas occurs in large volumes, from which reclaiming and conveying thereof is difficult. The most usual degassing equipment is a tank having a large diameter in which the gas in a gas contained liquid is permitted to rise to the liquid surface of the tank for removal. In order to be certain that a sufficient time period for degassing is given, the diameter of such a tank in large pulp plants can be 10-20 m and the height 5-6 m. It will thus be apparent to persons of ordinary skill that investment costs for a degassing tank of this kind are high and the reclaiming of gas therefrom is difficult.

Despite the fact that gas or air is usually present at certain process stages in the manufacture of pulp and paper, the presence of gas causes considerable disadvantages in both, the final product as well as in the treatment of the pulp or fiber suspension. As the most pronounced disadvantages caused by the entrainment of gas or air in the fiber suspension as they relate to the above-mentioned pulp and paper processes may be mentioned:

problems caused by the generation of foam in the above-referred to processes,
increasing capillarity and needle perforation,
instability of the fiber suspension in conduits, valves, screens, and the like,
increased pump cavitation,
dewatering problems,
fiber flocculation, and
decreasing formability when the stock is deposited on the wire of a paper machine.

The fiber line in a paper manufacturing plant is usually designed so that the different processing stations are arranged and housed in one building, that is, generally inside a three-story building wherein, as mentioned, the individual story height is about 6 m or more. According to the present invention the conventional process stations are modified to such an extent so as to dispense with the traditional multi-story pulp plant. Instead, the present invention permits the use of a single-story construction without substantially changing the dimensions or design parameters of the respective process stations located therein.

If the process stations of a fiber line were to be altered to be accommodated in a single-story plant, major parts of the equipment used would also require substantial redesigning. This new equipment is often more complex and considerably more expensive than the traditionally utilized equipment. However, investment costs for an entire fiber line of a pulp plant will decrease about 20-40% if the building housing the fiber line can be constructed lower and smaller. This is due to the fact that in addition to the building, all conduits, cable bundles, air conditioning, instrumentation and the like, are reduced in size relative to the building.

FIG. 1 illustrates schematically a fiber line of a traditional pulp plant including a digestion, screening, washing and bleaching station, whereby the individual process stations in the Figure have been separated from each other for sake of clarity by dotted lines.

FIG. 1 shows that part of the digester house which, as a part of the fiber line, is placed inside the building. The digester itself (not shown) is usually placed out of doors. A chip silo 1 is located on the roof 10 of the building. From the chip silo 1, chips drop through a chip gage 3 and a low pressure distributor 4 into a presteaming vessel 2. The presteaming vessel 2 is located on a third level 9. From the presteaming vessel 2, the chips fall via contaminant separation device 5 into a high pressure feeder 6 on the ground level 7, wherefrom chips flow into a digester generally located outside the building. As can be seen from the Figure, the chip distribution system of the digestion station requires a three-story building although an intermediate level 8, usually existing in the building, is not being utilized in this stage.

After the digestion house, at the screening stage, a pump 21 at the ground level 7 feeds pulp to be screened and freed from impurities such as sand, grit and metallic particles into a screen 22 at the intermediate level 8, wherefrom the pulp flows into a filter 23, usually a vacuum filter, at the top level 9. From the filter vat 28 filtrate flows through a suction or barometric leg 26 into a filtrate tank 24 at the ground level 7. The vacuum filter is installed at an elevated level so that the filtrate flowing down the suction leg 26 to the filtrate tank 24 creates the necessary vacuum within the filter 23. The distance between the bottom of vat 28 and the surface of the filtrate in filtrate tank 24 is usually at least about 10 m.

In the washing section subsequent to the screening stage, washing of the pulp is carried out by transferring the cooked pulp from the digester to remove the black liquor therefrom and to recover the spent cooking chemicals. Washing the pulp is generally achieved by suction or pressure filters such as a rotary vacuum or pressure cylinder. Normally, 2 to 4 of these washers are operated in series with counter-current flow of washing liquid. Foam which has a negative effect on washing efficiency is thereby generated depending on the type of pulp. Generally, the washer comprises a hollow pipe axis through which the filtrate is permitted to flow into a suction leg 36, usually about 10–12 m long, to be discharged into a filtrate tank 34. The filtrate tank 34 is of sufficient size to permit the entrained air to separate from the filtrate before the filtrate is pumped back to the repulping stage or the preceding washer showers. After the last washer, the pulp is transferred to a storage tank at high consistency. Depending on the type of the washer, a certain structural height is always required. Usually, placement of a washer in the plant is similar to that of the screening stage, i.e. pulp is fed from the ground level by means of a pump to a filter 33 at the top level 9 of the building, wherefrom filtrate flows into a filtrate tank 24 at the ground level 7.

Traditionally, after the washing stage, the bleaching of pulp is carried out in the bleach plant again by means of a three-story arrangement. A pump 41 discharges pulp from a bleaching tower (not shown) for distribution via feed pipe 48 to usually a plurality of suction washers 42, wherein soluble chemicals of the bleaching operation are removed by repeated dilution and thickening or by displacement. After washing, the pulp is transferred through a drop leg 40 from top level 9 to a high consistency pump 43 at the ground level 7 from where the pulp is pumped via a chemical mixer 44 into another bleaching tower to continue the bleaching reaction. The bleaching towers, usually located outside the building, are designed to ensure the efficiency of the bleaching reaction. Inside the building are placed usually only the apparatuses illustrated in the Figure, whereby the washer 42 is placed at the top level 9 and the suction required for separating the filtrate from the pulp is generated by means of a suction leg 45 which extends from the washer 42 on the top level 9 down to a tank 46 at the ground level 7.

One object of the present invention is to adapt the processes of a fiber line and to thereby simplify the construction of a pulp plant so that the above-described fiber line process stages or stations can be accommodated inside a one-story building. A further object of the present invention is to enable an essentially gas-free distribution of fiber and pulp suspensions from one process station to another without the need for customary degassing devices, preceding a pump, such as, for example, deaerating chambers, cyclones, drop conduits, suction legs and the like, wherein differences in height, the formation of droplets, variations in speed and vacuum are utilized for carrying out the degasification operations, and which for the greater part thereof require a considerable structural height.

SUMMARY OF THE INVENTION

These and other objects are achieved by providing an apparatus and method of treating a gas containing aqueous fiber suspension in a fiber line process of a pulp mill including at least one of pulp screening, washing and bleaching, comprising:

(a) transferring the gas containing aqueous fiber suspension at a consistency to a treatment station at a level;

(b) treating the fiber suspension at said level by removing a portion of the water from the aqueous fiber suspension so as to generate aqueous filtrate; and (c) simultaneously pumping and degassing the filtrate at said level.

In addition, the method and apparatus of the present invention may also result in the provision of a fiber suspension having a higher consistency after the treatment station relative to the consistency thereof prior to the treatment station and wherein the fiber suspension having said relatively higher consistency is pumped away from the treatment station at said level by fluidizing it, i.e. by imparting to the fiber suspension sufficient shear force so as to render the fiber suspension pumpable.

As a resulting advantage of the present invention can be mentioned that essentially the entire fiber line of a pulp plant can now be placed at a single level of a one-story building. The term "one level or single level" as used herein includes the arrangement of the various processing apparatuses at different heights on the same level or floor. The important advantage of the present invention is that all fiber line process steps can now be performed substantially on a single level as opposed to the prior art which required the customary three-story pulp plant.

The distribution of pulp between separate process stations along the fiber line can also be carried out essentially gas-free, while the pulp flow, the consistency, the homogeneity and the stability thereof remain adjustable process parameters. Further, in a pulp plant utilizing the apparatus and method of the present invention, the production capacity can be adjusted without problems within considerably wider limits than in a traditional plant. As an economical benefit, investment costs for a pulp plant will decrease by about 20–40%. This is based not only on the construction of a considerably smaller pulp plant but also takes into account the fact that less conduits, cable bundles, air conditioning, instrumentation, and the like, are needed.

A further object of the present invention is also the use of a pump provided with means for degassing and/or deaerating. In addition to achieving the objects mentioned above, it has been found in tests by the assignee herein, that the degassing and/or deaerating pump can be utilized, without exception, in almost every location in a pulp and paper plant to increase both the capacity and stability of any process performed therein and to remarkably decrease gas and foam problems which are detrimental to any such process. Based on these tests, the advantageous practical applications for the degassing and/or deaerating pump are at least the following:

| APPARATUS/PROCESS | APPLICATION/FUNCTION |
| --- | --- |
| ENVIRONMENTAL CONTROL TECHNOLOGY | |
| band filter press | suspension feed pump, and filtrate discharge pump |
| sedimentation | feed pump |
| decaying tower | discharge pump |
| slurry-ESP (band filter press for slurry) | feed pump |
| RECLAIMED FIBER LINE | |
| pulper | discharge pump |
| flotation | feed pump and discharge pump |
| filters | suspension feed pump and filtrate discharge pump |
| dithionite bleaching | suspension feed pump |
| high consistency press | suspension feed pump |
| CENTRIFUGAL CLEANING PLANT | |
| cleaning | deaerating pump and feed pump for pulp and water |
| PAPERMAKING MACHINE | |
| pulper | discharge pump |
| PP-plant (centrifugal cleaning plant) | feed pump |
| paper machine wire | water discharge pump |
| paper machine | feed pump for feeding pulp to the machine via a basis weight valve and circulation water pump and deaerating pump |
| curved screen | pulp feed pump and filtrate discharge pump |
| PULP PLANT (Chemical Pulp) | |
| debarking plant etc. | circulation water pump |
| chip washing | circulation water pump |
| continuous digesting | circulation liquor pump and discharging pump for a flash tank |
| batch digesting | blow off pump |
| washing | circulation water pump, suspension feed pump and filtrate discharge pump in a filter |
| pressurized washer | circulation pump, suspension feed pump and filtrate discharge pump |
| bleaching | feed pump for the filter and filtrate discharge pump |
| screening | suspension feed pump |
| drying machine | suspension feed pump and white water pump |
| PULP PLANT (Mechanical Pulp) | |
| grinder | discharge pump |
| screening | pulp feed pump |
| dithionite bleaching | pulp feed pump and feed pump to press |
| high consistency bleaching | feed pump to press |
| filters | pulp feed pump and filtrate discharge pump |

BRIEF DESCRIPTION OF THE DRAWINGS

The present invention is described in the following in more detail with reference to the accompanying drawings in which.

DETAILED DESCRIPTION OF THE PRESENTLY PREFERRED EMBODIMENTS

As used throughout this specification (including claims), the word "gas" is intended to include any and all gases, whether free, combined or dissolved, including by way of example only air; and the expression "deaerating pump" or "degassing pump" is intended to mean a centrifugal pump capable of separating gas (as above defined) from the working liquid passing through the pump, which includes a gas channel for conveying separated gas from a zone upstream of or in front of the impeller to a zone downstream of or in the back of the impeller, said pump further including a vent to permit the removal of said separated gas from the pump. Examples of suitable deaerating pumps are a pump sold as a degassing MC® pump by the assignee of the present invention, A. Ahlstrom Corporation, another pump sold by said assignee under the trademark AHLSTAR ™ equipped with AIRSEP ™ degassing. Also as used herein, the term "liquid" is intended not only to embrace liquids as conventionally defined but also slurries and suspensions which flow like liquids or are caused to flow through a deaerating pump like a liquid.

Figure 1:
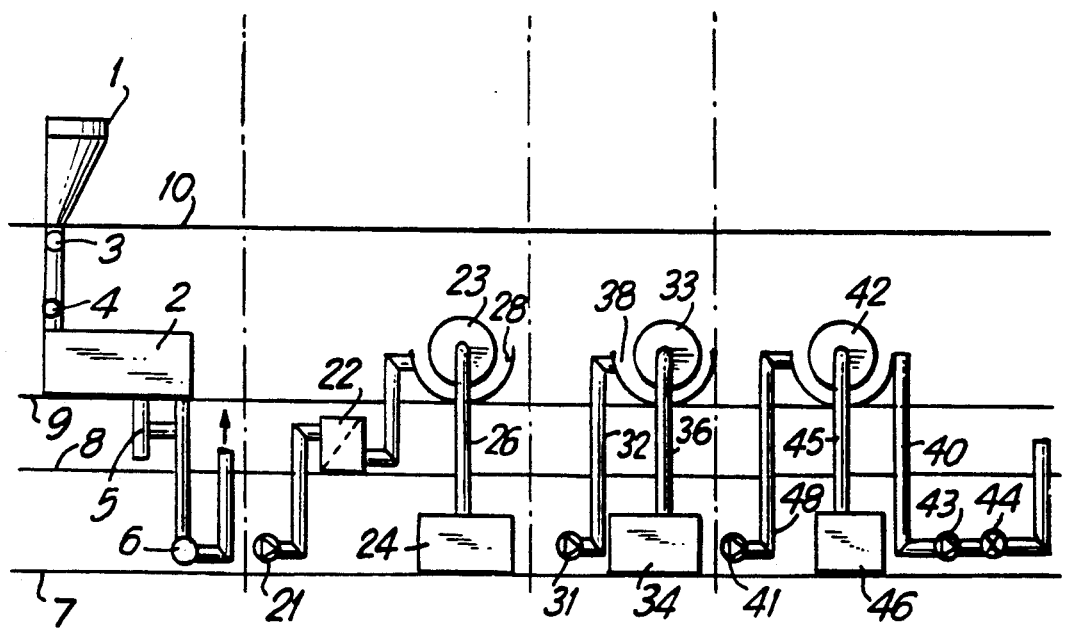
FIG. 1 illustrates schematically part of a prior art fiber line comprising chip distribution in a digestion station, screening and filtering, washing and bleaching stations.
Figure 2:
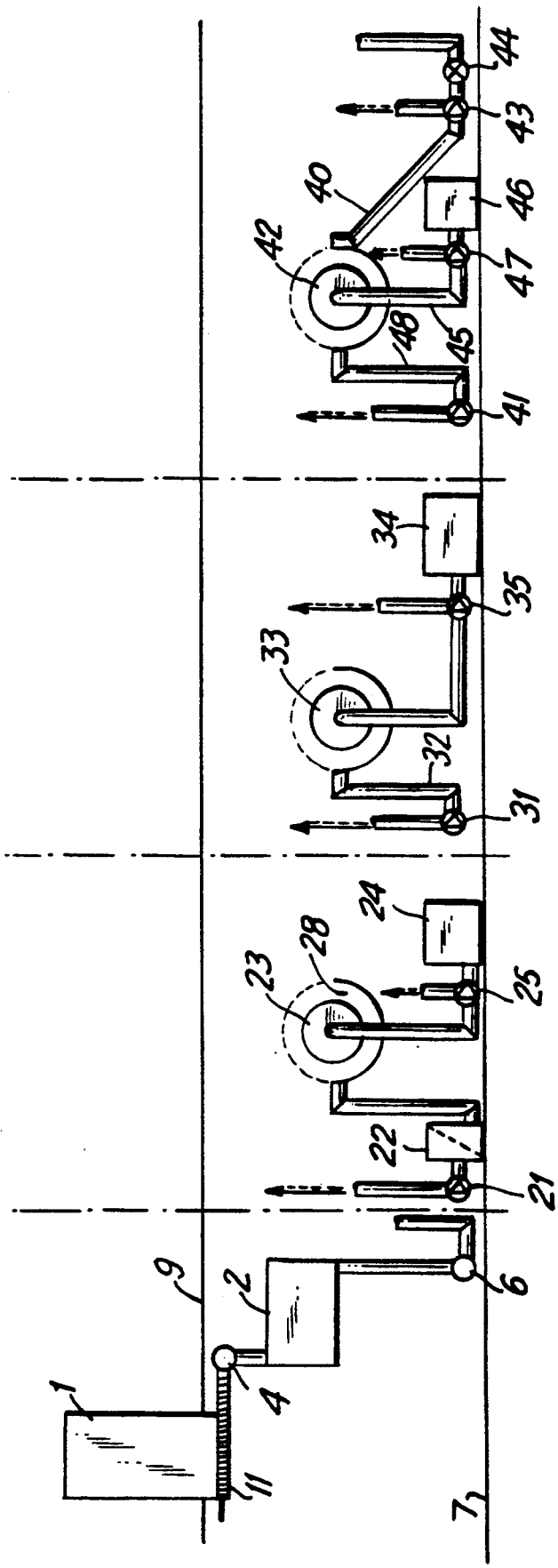
FIG. 2 shows schematically the fiber line station of FIG. 1 as adapted in accordance with the present invention.

As can be seen from FIG. 2, the chip feeding system according to the present invention is formed as essentially a one-story construction. Like the traditional set-up, the chip silo 1 is disposed above the top level 9, e.g. on the roof of the building, however, as the roof is now located about 10-15 m lower as compared to the prior art construction of FIG. 1, further transfer of the wood chips is carried out in a different manner, as the differences in height required in the traditional set-up are no longer needed. In the embodiment according to FIG. 2, the prior art chip gage has been replaced by a proportioning screw 11, which transfers the chips to a low pressure feeder 4, from which the chips are transferred to a presteaming vessel 2 and further into a high pressure feeding apparatus 6, and from there, to a digester (not shown). A contaminant separation apparatus (not shown in FIG. 2) is advantageously placed elsewhere, e.g. before the chip silo 1 for space saving reasons. This novel construction creates a forced chip feed which is disposed prior to the digester. This also enables a low construction of the digestion stage so as to be accommodated in a one-story building. Although, as already stated, in this embodiment the contaminant separation device has been located elsewhere for space saving purposes, this is not necessarily required. It is also possible to utilize a low pressure straining system which can be connected to the presteaming vessel.

The screening station, subsequent to the digestion station has been adapted in accordance with the present invention, as illustrated in the FIG. 2, to be accommodated into a one-story building so that a deaerating suction pump 25 is used instead of the prior art suction or barometric leg 26 of suction filter 23 in order to transfer the filtrate from vat 28 into filtrate tank 24. Due to the present invention it is no longer necessary to position the screening station over three levels, but all required apparatuses can now be placed at the bottom or ground level 7 including the screen 22 and the feed pump 21 which is preferably also a deaerating pump so as to increase the capacity of the screen.

The washing station subsequent to the screening station has, as illustrated in FIG. 2, also been reconstructed and adapted in accordance with the present invention to be accommodated into a one-story building in a similar manner as the screening station described above. In other words, the suction leg 36 (FIG. 1) of the vacuum or pressure filter 33 which extended from the filter 33 on the top level 9 all the way down to the filtrate tank 34 on the ground level 7 has been removed and, instead, a deaerating pump 35 has been placed on the ground level and in connection with filter 33 for removing the filtrate from the fiber suspension into a filtrate tank 34. Hence, due to the present invention it is no longer necessary to position the washing station over three levels but all apparatuses can now be located on a single level, preferably the ground level 7, including the feed pump 31, which is preferably also a degassing pump.

Accordingly, the washing station has been considerably simplified by eliminating the prior art deaeration tank and by being able to place the washer on the same floor as the pumps. In this connection, it should be noted that the deaeration or filtrate tank 24 in conventional washing plants contain about 1500 m³ of filtrate in a plant with a production of about 1000 tons of pulp per day. The filtrate tank diameter is about 15-20 m. Although in a bleach plant the filtrate tank is somewhat smaller, there is still approximately 200-400 m³ filtrate accumulated in a plant which produces about 1000 tons of pulp per day. In addition to the elimination of the prior art deaeration tank and barometric leg, it is no longer necessary to waste energy by pumping the filtrate from the ground floor to the third floor over a height of about 12 m to the preceding washer showers in a plant containing a series of washers. Equally, feed pipe 32 which, as is shown in FIG. 1, customarily extends from ground level 7 approximately 15 m up to top level 9 can be considerably shortened and consequently energy saved by being able to place feed pump 31, filter 33, deaerating pump 35 and filtrate tank 34 substantially on a single level.

The bleaching station subsequent to the washing station, as illustrated in FIG. 2, has also been adapted, in accordance with the present invention, to be accommodated into a one-story building or to be located at a single level by eliminating the long feed pipe 48, suction leg 45 and drop leg 40 as shown in FIG. 1. Accordingly, at ground level 7, feed pump 41, which is, preferably, a degassing pump for minimizing the gas content in the fiber suspension, discharges pulp from the bleaching tower (not shown) and transfers the pulp to a suction washer 42 located substantially at the same level as the feed pump and wherein the residual soluble chemical substances from the bleaching operation are removed. After the washing, the pulp that is removed from the mesh wire screen and discharged as an over-flow to the suction side of a pump 43 capable of pumping high consistency pulp and from there via a mixing apparatus 44 for chemicals into a subsequent bleaching tower (also not shown) which is preferably located out of doors.

Pump 43 is preferably a degassing pump for minimizing the gas content of the high consistency pulp. In order to arrange the entire bleaching plant at a single level, a degassing pump 47 instead of the long suction leg 45 shown in FIG. 1 is connected to the suction washer 42 for removing the filtrate therefrom.

The suction leg 45 of FIG. 1, which in the prior art installations extended from the suction washer 42 on the top level 9 down to the filtrate tank 46 on the bottom level 7 and which was indispensable for creating the required suction effect for separating the filtrate from the pulp suspension in a bleaching station, has thus been eliminated.

Due to the present invention, the heretofore necessary structural height of a bleaching plant, usually a three-story building with each story having a height of about 6 m, is no longer necessary, as all apparatus of the bleaching station can now be located on a single level.

Due to the arrangement of the present invention feed pipe 48, suction leg 45 and drop leg 40 can be considerably shortened and energy saved otherwise required for moving the fiber suspension, filtrate and high consistency pulp, respectively. In addition, gases which have been separated in tank 46 and which traditionally have been vented into the open air can now be recovered upon discharge from degassing pump 47. In addition, washing water required for suction washers 42 need not be pumped up to top level 9 which, in other words, permits the use of pumps with a considerably reduced head.

As a degassing pump for practicing the instant invention can be used a centrifugal pump including a gas discharge passage for conducting the gas collected in front of the pump impeller out of the pump. Preferably, a vacuum pump cooperates with the centrifugal pump in known manner. A commercially available pump which can be used for accomplishing the recited objects of the present invention is, for example, a degassing MC®-pump manufactured by A. Ahlstrom Corporation, the assignee herein.

Alternatively, the objects of the present invention can also be accomplished, e.g., in the screening station by replacing the traditional suction filter 23 (FIG. 1) by a closed hydraulic pressurized thickener, such as the hydraulic pressurized dewatering device described by Henricson et al. in Paper and Timber, March 1989, pp. 249-251 or in U.S. Ser. No. 336,712, filed Apr. 12, 1989 which are incorporated herein by reference in their entirety. Dewatering is then performed due to the pressure of the incoming pulp suspension, whereby the introduction of air into the suspension is avoided which, in turn, eliminates the requirement for the prior art suction leg for creating suction from the filter to the filtrate tank. According to the present invention, positioning the apparatus becomes independent of the pressure head and allows the apparatus to be positioned at the ground level, thus also permitting the construction of a one-story plant housing all fiber line process stations.

In hydraulic pressurized dewatering or thickening, pulp is generally fed through a filtering device such as, for example, a screen, wherein screening takes place at a low consistency, e.g. between about 1-5%, in a drum displacement apparatus, i.e. a drum provided with a plurality of compartments or sectors, wherein the pulp is thickened to a higher consistency, e.g. to a consistency of between about 10-15% due to the pressurized incoming pulp. According to a preferred embodiment, rejected pulp material is fed from a first screen directly into a secondary screen with smaller perforations, wherefrom accepted pulp is recycled to the first screen and the rejected pulp is fed into a first closed pressure thickener from which pulp flows under pressure into a refiner without the need for a feed screw. Pulp at low consistency is fed into the first thickener wherein the filtrate is removed by means of turbulence. By selecting a proper size mesh (diameter e.g. 1-2 mm) fibers with filtrate can be removed while the remaining reject pulp which has been thickened to a higher consistency flows to the refiner. In this way refining and thickening of the reject pulp is performed under pressurized conditions and the detrimental mixing or entrainment of air with the pulp has been avoided. Also, cleaning of the pulp and the subsequent thickening thereof can be performed under pressurized and closed conditions which permits great freedom in apparatus lay-out, so that (1) together with the pulp to be cleaned, filtrates from a first thickener and drum displacer are fed into cleaners, and (2) accepts from cleaners are passed into a second thickener, which is a pressurized dewatering apparatus, whereby the filtrate from this second thickener is also passed to the cleaners.

The construction of washing and bleaching stations can also be modified to be accommodated at a single level or in a one-story building by using the same principles as described above in connection with the screening station, i.e. the washing and bleaching stations are provided with hydraulic and closed pressurized washers, which do not require any suction.

In general, the various process steps of a fiber line can, in accordance with the present invention, be adapted to be accommodated at a single level by providing only a few key points of the respective system with pumping means for pressurizing the suspension to be treated so that the pulp suspension will pass from an apparatus to another due to the operation of pressure.

Each fiber line process station is composed of a group of devices, e.g. the screening station is composed of a pump/screen-thickener assembly, whereby in each of them the input pressure of the pump is dimensioned sufficient so as to maintain an over-pressure for preventing air from entering the system and for creating the pressure difference required for performing the thickening operation.

With respect to the different process stations of a fiber line, it should be noted that irrespective of the use of degassing and/or deaerating pumps or the use of pressurized hydraulic dewatering devices, it is preferred to utilize high consistency pulp technology and pulp fluidization after each group of devices or process station for transferring the pulp toward the next process station. According to the present invention it is particularly advantageous to use a fluidizing pump, which is most preferably a degassing and/or deaerating MC ®-pump. It should also be noted that the MC ®-pump can be dimensioned so as to act as a feed pump for a hydraulic pressurized dewatering device and/or fiber line process station preceding a degassing and/or deaerating pump and to create the pressure necessary for the following group of devices or following fiber line process station. Hence, there is no need for any suction leg which permits the free arrangement of the respective group of devices in each fiber line station.

Figure 3:
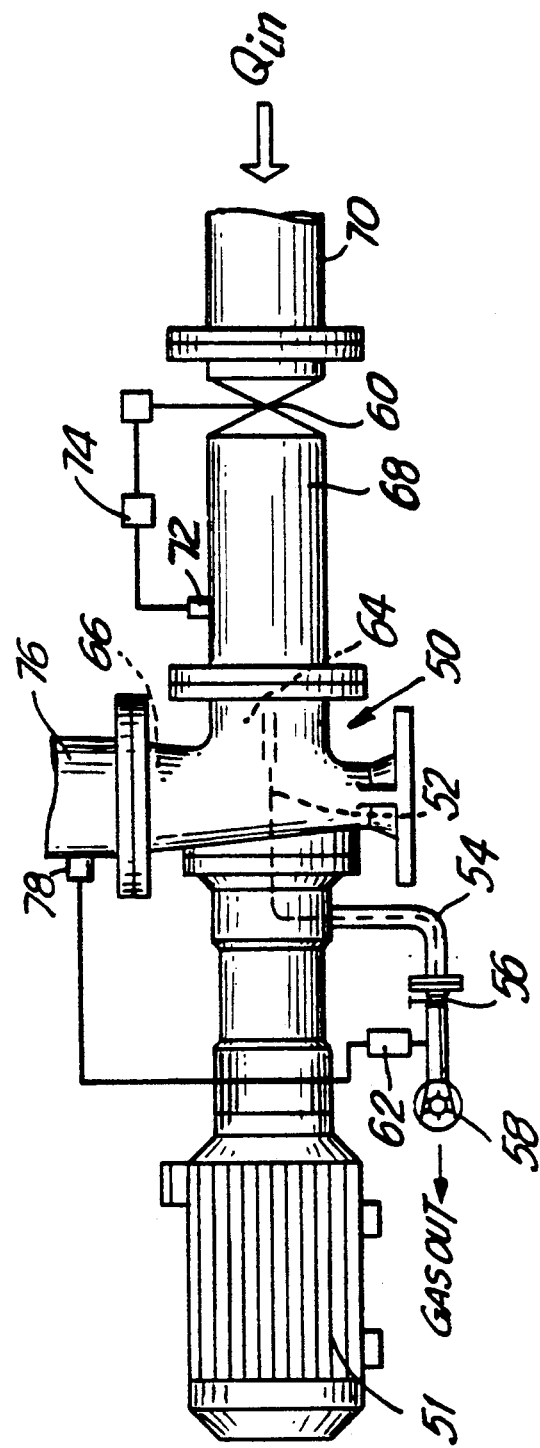
FIG. 3 is a schematic illustration of a preferred control circuit for a degassing pump for practicing the method of the present invention.

As shown in FIG. 3, the deaerating pump for use with the apparatus and method of the present invention preferably comprises a centrifugal pump 50 with a channel 52 within the pump which is connected to an exterior gas discharge pipe 54, and via valve 56 to a suction or vacuum pump 58, which can be, for example, a well-known NASH-pump. The drawing also schematically illustrates control valves 60, 62 for controlling the reduced pressure generated by suction pump 50. The centrifugal pump 50 has, as is known, a motor 51, a suction opening 64 and a pressure opening 66. A suction duct 68 is mounted to the suction opening. The duct 68 is connected by a valve 60 to the inlet pipe 70 for the fiber suspension. The control circuit further comprises a pressure sensor 72 connected to the suction duct 68 and a control unit 74 which is connected to valve 60 to regulate the operation of the valve.

In operation, the fiber suspension is drawn by pump 50 into suction duct 68 through valve 60 from inlet pipe 70. The flow is constricted by valve 60 in such a way that a reduced pressure is generated in the suction duct and in the suction opening 64 of the pump thereby facilitating the separation of gas from the fiber suspension. Hence, the flow is throttled as much as possible short of avoiding boiling thereof thereby maximizing air removal. Pressure sensor 52 in the control circuit and control unit 74 maintain the pressure in the suction duct sufficiently high to prevent the suspension from boiling due to the reduced pressure. In this manner the amount of gas separated from the suspension in front of the impeller is as great as possible and the separated gas is discharged from the centrifugal pump 50 via the conventional route. Thus, centrifugal pump 50 is pumping suspension through pressure opening 66 and the gas content of the suspension is considerably lower than that of the suspension in the inlet pipe 70. Control unit 62 and pressure sensor 78 also control the pressure difference between the air bubble created in front of the pump impeller and the pressure in discharge pipe 76 to maintain the pressure differential at the desired level.

It should be understood that the preferred embodiments and examples described are for illustrative purposes only and are not to be construed as limiting the scope of the present invention which is properly delineated only in the appended claims.

What is claimed is:

1. A method of treating a gas containing aqueous fiber suspension in a fiber line process of a pulp mill, the process including at least one of a step of pulp screening, washing and bleaching, said method comprising the steps of:
   (a) transferring the gas containing aqueous fiber suspension at a consistency to the process at a floor level;
   (b) screening the suspension at the same level;
   (c) washing the fiber suspension and removing a portion of the water from the aqueous fiber suspension at said level so as to generate aqueous filtrate; and
   (d) pumping and degassing the aqueous filtrate at said level, said pumping and degassing action generating a suction head for removing the portion of water in step (c);
   wherein said step (a) is performed by means of a pump so as to generate a pressure sufficient for feeding the aqueous fiber suspension to said steps (b) and (c)

2. The method of claim 1, additionally comprising a bleaching step preceding said step (a); said step (a) being performed by pumping the fiber suspension through step (b) to said washing step (c).

3. The method of claim 1, comprising the additional steps of generating in step (c), in addition to the aqueous filtrate, a fiber suspension having a relatively higher consistency; and facilitating the discharge of the fiber suspension of relatively higher consistency from said washing step (c) by subjecting the fiber suspension at said level to shear forces of sufficient strength so as to render the fiber suspension pumpable.

4. The method of claim 1, wherein in said treatment step (c), in addition to the aqueous filtrate, a fiber suspension having a relatively higher consistency is generated and discharged from said treatment step at said level, by subjecting the fiber suspension to shear forces of sufficient strength so as to render the fiber suspension pumpable.

5. The method of claim 1, comprising the additional step of degassing the fiber suspension at said level simultaneously with said step (a).

6. The method according to claim 1, wherein said treatment step (c) is performed under the pressure generated by said step (a).

7. An apparatus for the treatment of an aqueous gas containing fiber suspension in a fiber line process of a pulp mill, the process including at least one of pulp screening, washing and bleaching treatments, said apparatus comprising in combination:
- means disposed at a floor level for screening the suspension;
- means at said level for treating the fiber suspension by removing a portion of the water from the fiber suspension by the application of suction so as to generate an aqueous filtrate;
- means at said level connected to said screening means for generating pressure and for transferring the aqueous fiber suspension through said screening means to said treating means;
- means at said level operatively connected to said treating means for simultaneously pumping and degassing the aqueous filtrate and for generating a suction head for operating said treating means;
- means at said level for pumping fiber suspension away from said treatment means and subjecting the fiber suspension to sufficient shear force so as to render the fiber suspension pumpable;
- said treating means for the fiber suspension comprising a washer operating under the suction generated by said filtrate pumping means.

8. The apparatus of claim 7, wherein said means for subjecting the fiber suspension to shear forces comprises a mixer located downstream of said means for pumping the fiber suspension away from said treatment means.

9. A method of treating a gas containing aqueous fiber suspension in a fiber line process of a pulp mill, the process including at least one of a step of pulp screening, washing and bleaching, said method comprising the steps of:
- (a) transferring the gas containing aqueous fiber suspension at a consistency to the process at a floor level;
- (b) screening the suspension at same level;
- (c) thickening the fiber suspension by removing a portion of the water from the aqueous fiber suspension at said level so as to generate aqueous filtrate; and
- (d) pumping and degassing the aqueous filtrate at said level, said pumping and degassing action being used for generating a suction head for removing the portion of water in step (c);
- said step (a) is performed by means of a pump so as to generate a pressure sufficient for feeding the aqueous fiber suspension through said step (b) and said step (c).

10. The method of claim 9, wherein in said treatment step (c), in addition to said aqueous filtrate, a fiber suspension having a relatively higher consistency is generate, and discharged from said treatment step at said level, by subjecting said fiber suspension to shear forces of sufficient strength so as to render the fiber suspension pumpable.

11. The method of claim 9, comprising the additional step of degassing said fiber suspension at said level simultaneously with said step (c).

12. The method of claim 9, wherein said treatment step (c) is performed under said pressure generated by said step (a).

13. An apparatus for the treatment of an aqueous gas containing fiber suspension in a fiber line process of a pulp mill, said process including at least one of pulp screening, washing and bleaching treatments, said apparatus comprising in combination:
- means for screening the suspension, at floor level;
- means at said level for treating the fiber suspension by removing a portion of the water from the fiber suspension by the application of suction so as to generate an aqueous filtrate;
- means at said level connected to screening means for generating pressure and for transferring the aqueous fiber suspension from said screening means to said treating means;
- means at said level operatively connected to said treating means for simultaneously pumping and degassing the aqueous filtrate and for generating a suction head for operating said treating means;
- means at said level for pumping treated fiber suspension away from said treating means and subjecting the fiber suspension to sufficient shear force so as to render the fiber suspension pumpable;
- said treating means for the fiber suspension comprising a thickener operating under the suction generated by said filtrate pumping means.

14. The apparatus of claim 13, additionally comprising a mixer located downstream of said means for pumping treated fiber suspension by subjecting the fiber suspension to shear forces.

* * * * *